D. H. Krauser,
Turning Irregular Forms,
N° 23,175. Patented Mar. 8, 1859.
Fig. 1.
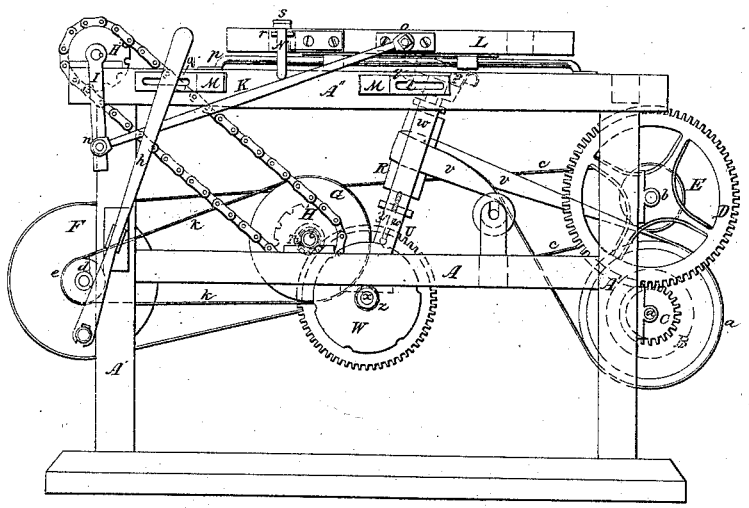
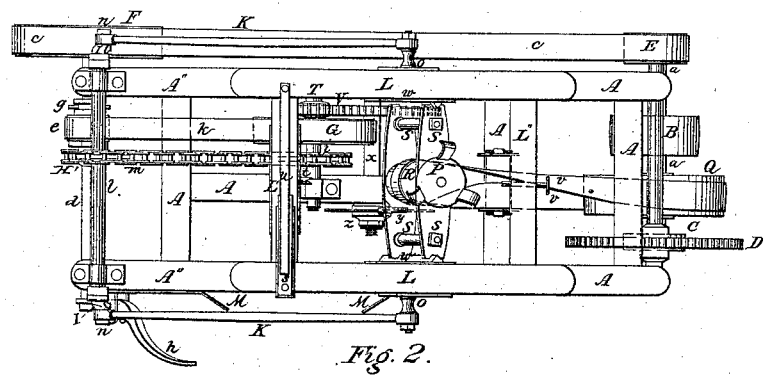
Fig. 2.
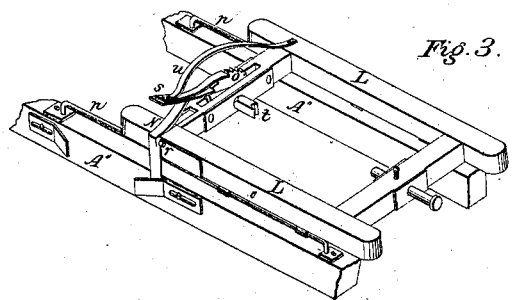
Fig. 3.
Witnesses:
Inventor:

UNITED STATES PATENT OFFICE.

DANIEL H. KRAUSER, OF POTTSVILLE, PENNSYLVANIA.

MACHINE FOR TURNING IRREGULAR FORMS.

Specification of Letters Patent No. 23,175, dated March 8, 1859.

*To all whom it may concern:*

Be it known that I, DANIEL H. KRAUSER, of Pottsville, in the county of Schuylkill and State of Pennsylvania, have invented new and useful Improvements in Machinery for Turning Irregular Forms, such as Spokes, Ax-Helves, &c.; and I do hereby declare the following to be a full and exact description thereof, reference being had to the accompanying drawings.

The nature of my invention consists of so arranging and combining the parts of my machine as that the cutters are made to approach, or recede from, the axis of the article to be shaped, while it is caused to traverse over said cutters, and is turned upon its axis at the proper time so as to present a new face to the action of the cutters.

Figure 1 is a side elevation of my machine. Fig. 2 is a top view or plan of the same. Fig. 3 is an isometrical projection of the carriage showing the manner of rotating the article to be turned, and shows the manner of throwing the carriage in and out of gear.

A A' A'' is the frame of the machine. On the uprights A' A', extending from one to the other, and supported by journal boxes, is the shaft $a$, Fig. 1, on which is fixed the driving pulley B, through which motion is communicated by steam or other power. On the same shaft ($a$) is fixed the pinion C, which meshes into and gives motion to the spur wheel D, on the shaft $b$, immediately over and parallel with the shaft $a$. The shaft $b$ carries a pulley E, which gives motion to the belt $c$, to the pulley F, on the shaft $d$ at the opposite end of the machine. On the shaft $d$ is placed a loose pulley $e$, which may be fixed to the shaft, so as to revolve with it, by means of the coupling gland or clutch $g$ shown in Fig. 2 and which is operated by the lever $h$ in a manner common to all machinery, and therefore needs no description, but will be understood on referring to the drawings. When the pulley $e$ is fixed to the shaft $d$, it gives motion to the pulley G, on the shaft $i$, by the belt $k$. The shaft $i$ carries a toothed chain wheel H which gives motion to another toothed chain wheel H' by means of the endless chain $m$. The wheel H' is on the shaft $l$ which is supported on the top A'' A'' of the frame of the machine and carries, (one at each of its extremities) the crank arms I, I. The connecting rods K, K, extend from the crank pins $n$, $n$, to joint pins $o$, $o$, on the sides of the frame of the carriage L, L, which thereby receives a reciprocating motion from the revolution of the crank arms I, I; the carriage L sliding upon guides $p$, $p$, on the top A'' A'' of the frame of the machine. The crank pins $n$, $n$, are made adjustable on the crank arms, so as to lengthen or shorten, at will, the traverse of the carriage L, the cross ties L', L'', of which, support the centers between which the wood to be turned is secured.

The manner in which the spoke, or other article is revolved upon its axis for a part of a revolution—at the time when the direction of the motion of the carriage is changed—is as follows, viz.: On the side of one of the top plates A'' of the frame are placed two plates M, M, having their nearest ends turned out from the frame A so as to form therewith an angle or < for each plate M as seen in Figs. 1 and 2. These plates are so placed on the frame A'' that the angle that each forms with the frame shall be at a distance from each other equal to the distance traversed by the carriage L, and at the extremities of the distance traversed by the cross-tie L' of the carriage. The plates M, M, are adjusted by the slots and set screws $q$, $q$, that their distance apart may be the same as the lengthened or shortened traverse of the carriage L. A bent lever N, is secured by a joint $r$ to the frame of the carriage L at the extremity of the cross-tie L'; one of the arms of the lever resting on the top of and along the cross-tie, and the other arm projecting down and out over the top of the frame A'' so as to be below the top of the plates M, M. When the carriage has reached the extremity of its traverse, the lower arm of the bent lever N, is forced toward the side of the frame A by passing into the angle formed by the plate M with the frame, the other arm of the lever is lifted up and puts in motion a feed hand $s$ which in turn pushes around the ratchet wheel O. This ratchet wheel is secured to the arbor of the chuck $t$ which securely holds one end of the article to be turned, while the other end is supported on a pivot center, in the ordinary way, attached to the cross-tie L''. The bent lever N is made to resume its position after leaving the plates M, by the spring $u$, which presses against the end of the feed hand and forces it down upon the inner end of the lever N, when the outer lower end of the same is relieved from the plates M by being carried away from their action. A new face of the material to be wrought is thus then presented to the action of the cutters every time the direction of the carriage L is changed.

The manner in which the cutters P, are operated, will be now described: On the shaft a is fixed a pulley Q giving motion through the belt v, to the spindle R. This spindle has its bearings in the frame S, and bears on its upper end the stock for the cutters P, shown in dotted lines in Fig. 1 and more distinctly in Fig. 2. The frame S, slides upon guides w w on the inner sides of the frame A of the machine; which guides are set at a sufficient angle from the vertical to allow one only of the cutters to come in contact with the work as they revolve. This will be understood on referring to the drawings. On the shaft i of the pulley G, and chain wheel H, is a pinion T Fig. 2 (position marked in dotted lines in Fig. 1) which takes into a spur gear U, on the shaft x. This shaft carries the pattern cam W, the periphery of which is so formed as that by its revolution it shall cause the cutters to rise and fall at the proper time to insure the desired shape of the work to be done. The rise and fall of the cutters is effected by means of the adjustable bolt y, which is attached to, and extends down from the bottom of the frame S, of the cutters, and rests upon the periphery of the pattern cam W. The cutters are adjusted in their distance from the center of the work by the screw which secures the bolt y to the frame S. Different pattern cams are used for differently shaped work and are changed at will on removing the screw clamp z on the end of the shaft e.

Having thus fully described my invention, what I claim as new therein, and desire to secure by Letters Patent, is—

1. The manner of causing the carriage L, which supports the work, to traverse over the cutters by means of the pulleys E, F, e, and G, belts c and k, endless chain m, crank arms I, and connecting rods K—arranged and operating as before described—in combination with the means described for turning the work on its axis through the plates M, bent lever N, pawl s and ratchet wheel O, substantially as set forth.

2. I do not claim the reverse pattern wheel w in itself as new, but, what I do claim is: the arrangement of the pulley Q, belt v, spindle R in frame S, with the reverse pattern wheel W, arranged, and operating as set forth, and described.

DANIEL H. KRAUSER.

Witnesses:
MORGAN REED,
JACOB KRAUSER.